United States Patent [19] [11] 4,215,348
Cordaro et al. [45] Jul. 29, 1980

[54] METHOD OF AND SYSTEM FOR SYNCHRONIZING DATA RECEPTION AND RETRANSMISSION ABOARD COMMUNICATION SATELLITE

[75] Inventors: Giovanni Cordaro, Milena; Cristiano Dall'Olio, Turin; Duccio Di Pino, Turin; Eugenio Guarene, Turin, all of Italy

[73] Assignee: CSELT-Centro Studi e Laboratori Telecomunicazioni S.p.A., Turin, Italy

[21] Appl. No.: 24,445

[22] Filed: Mar. 27, 1979

[30] Foreign Application Priority Data

Apr. 4, 1978 [IT] Italy ............................. 67729 A/78

[51] Int. Cl.² ........................................... H04L 7/00
[52] U.S. Cl. .................................. 370/97; 375/110; 370/104
[58] Field of Search ............... 343/179; 178/69.1; 179/15 BS

[56] References Cited

U.S. PATENT DOCUMENTS 4,010,323   3/1977   Peck ................................ 178/69.1
4,088,832   5/1978   Eastmond ....................... 178/69.1

Primary Examiner—Douglas W. Olms
Attorney, Agent, or Firm—Karl F. Ross

[57] ABSTRACT

A receiver aboard a communication satellite, designed to detect digital signals arriving in intermittent bursts from a ground station with a bit cadence differing but slightly from a clock frequency $f_s$ generated by a time base on the satellite, comprises a synchronizer controlled by that time base for reorganizing the detected bits into a data frame in step with clock frequency $f_s$ preparatorily to processing and retransmission thereof. The synchronizer samples a square wave of frequency $2f_s$ substantially at the midpoint of an initial bit period of an incoming signal stream, with the aid of a timing signal extracted from that signal stream, and determines from the sample whether this square wave or an inversion thereof is to be used in establishing the instants of reading of the subsequently received bits. The bits thus read, after interim storage in two cascaded registers, are fed to a data processor in the rhythm of clock frequency $f_s$. No data are lost as long as the drift between the clock cycles and bit periods does not exceed one fourth of a clock cycle for the duration of a burst.

8 Claims, 3 Drawing Figures

METHOD OF AND SYSTEM FOR SYNCHRONIZING DATA RECEPTION AND RETRANSMISSION ABOARD COMMUNICATION SATELLITE

FIELD OF THE INVENTION

Our present invention relates to a method of timing the reading of data bits in a stream of digital signals intermittently received by a relay station, such as a communication satellite, as well as to a system for carrying out this method.

BACKGROUND OF THE INVENTION

The exchange of digital data between ground stations and a communication satellite may be based on the principle of time-division-multiplex access (TDMA), utilizing several channels of different carrier frequencies each serving for the transmission of messages from a plurality of ground stations in the form of interleaved bursts separated by intervening guard intervals. Aboard the satellite, the data bursts of an incoming message frame are processed for retransmission to their respective destinations in an outgoing message frame of similar structure; the on-board processing includes demodulation of the incoming carrier, regeneration and re-amplification of the base-band signals, and modulation of these signals upon an outgoing carrier. These operations necessarily proceed under the control of a time base aboard the satellite; the bit cadence of the incoming signals, however, is determined by the clocks of their respective ground stations.

Even if the time base of the satellite is controlled by a ground-station clock with the aid of synchronizing signals, its clock frequency will generally deviate from that of the ground station to a greater or lesser extent, e.g. on account of operational delays, Doppler shifts due to relative motion between the satellite and a ground station, and phase differences between the clocks of ground stations accessing the same channel. As a result, distortion or loss of information may occur when the bits received aboard the satellite are read in a rhythm deviating from their rate of arrival.

A possible solution to this problem lies in the use of a buffer memory designed to store a certain number of incoming bits (e.g. three) in respective stages from which they can be read out at a rate different from their rate of loading. This solution, however, necessarily delays the transmission of acknowledgment signals from the satellite to the originating ground stations which serve for the correction of excessive phase shifts between the signal stream emitted by that station and the window allocated to the station in the transmitted message frame. Such a delay, which may amount to the full storage time of the buffer memory, would necessitate a lengthening of the guard intervals between successive bursts in order to prevent interference between messages from different stations; this, in turn, would reduce the capacity of the channel.

OBJECTS OF THE INVENTION

The general object of our present invention, therefore, is to provide a method of and a system for more effectively synchronizing data reception and retransmission by a relay station such as a communication satellite, with avoidance of data loss and with maintenance of relatively short guard intervals.

A more particular object is to provide an improved synchronization method and system enabling the use of mutually independent clocks aboard the satellite and at the associated ground stations.

SUMMARY OF THE INVENTION

Our invention is based on the availability at the relay station (referred to hereinafter as a satellite) of a clock frequency $f_s$ which is close to the bit cadence in a stream of digital signals intermittently received by the satellite from a remote transmitting station; for reasons that will become apparent hereinafter, the difference between the clock frequency $f_s$ and the bit cadence $f_g$ (determined by the clock frequency of the transmitting ground station) should be so related to the duration of a burst that the drift between clock cycles $1/f_s$ and bit periods $1/f_g$ does not exceed one-fourth of a clock cycle for that duration. After extraction of a timing signal corresponding to the bit cadence $f_g$ from a signal stream or burst of limited duration detected aboard the satellite, a square wave of frequency $2f_s$ generated by an on-board time base is sampled in response to the extracted time signal at an instant substantially coinciding with the midpoint of an initial bit period of the detected signal stream; that initial bit period may be one of several such periods (not necessarily the first one) which carry no message content but merely serve for the detection of the bit cadence, as is well known per se. On the basis of the sample so obtained, i.e. the instantaneous amplitude of the square wave, one of two mutually interleaved trains of synchronizing pulses each having a cadence $f_s$ is selected in such a way that the first selected synchronizing pulse occurs in one of the two middle quarters of a bit period, preferably the second quarter. The subsequent bits of the detected signal stream are then read at the instant of occurrence of the synchronizing pulses of the selected train and are organized into a data frame in step with clock frequency $f_s$.

According to a more particular feature of our invention, the two interleaved trains of synchronizing pulses are homogeneous pulse flanks (i.e. leading or trailing edges) of the aforementioned square wave and of another square wave of the same frequency $2f_s$ in phase opposition therewith. The selection may be carried out with the aid of switch means such as a multiplexer having two inputs connected to an output lead of the time base carrying the first-mentioned square wave, the other square wave being obtained from an inverter in series with one of these inputs.

BRIEF DESCRIPTION OF THE DRAWING

The above and other features of our invention will now be described in detail with reference to the accompanying drawing in which.

SPECIFIC DESCRIPTION

Figure 1:
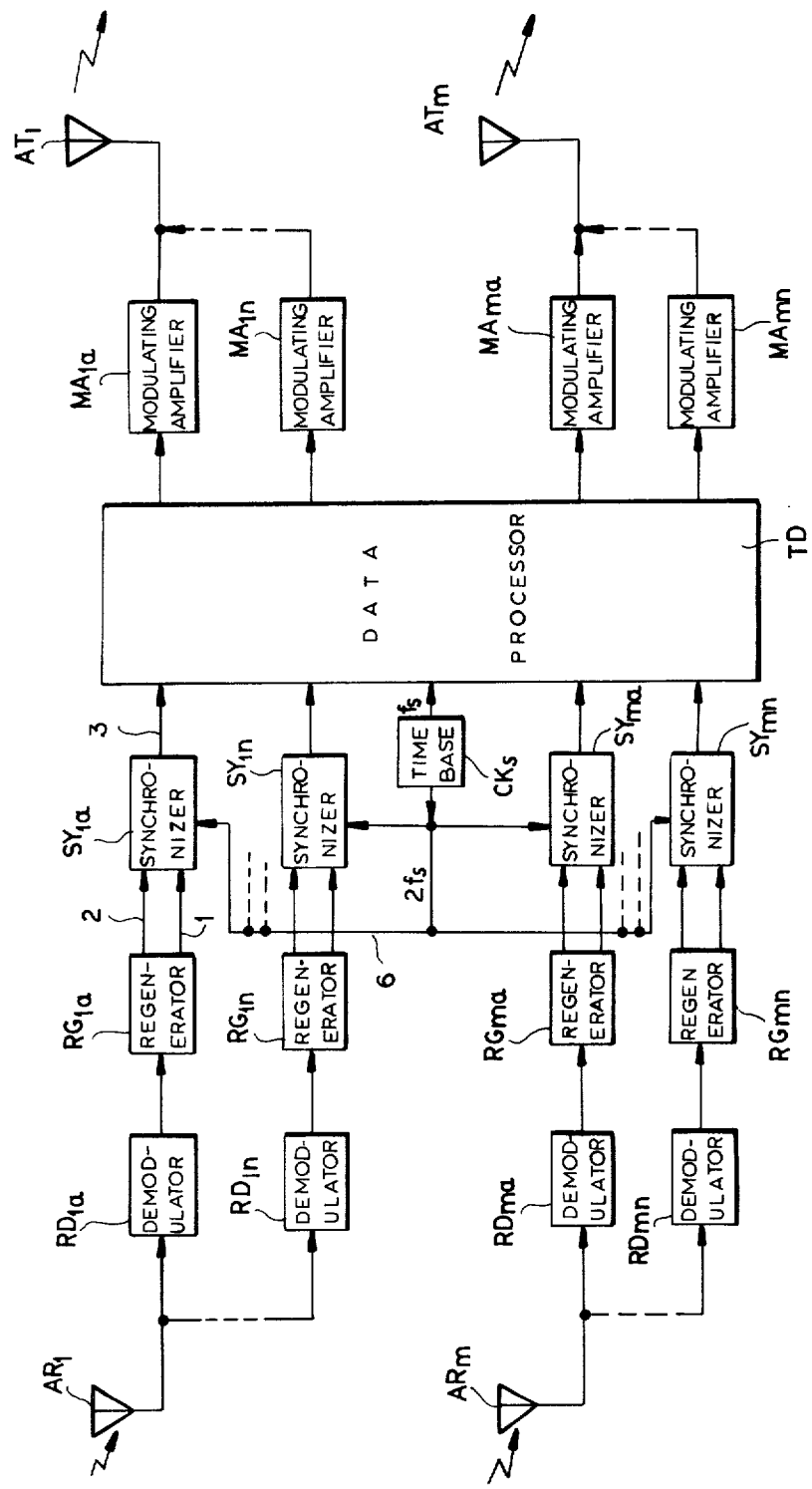
FIG. 1 is a block diagram of receiving and retransmission equipment aboard a communication satellite operating in conformity with our invention.

The equipment shown in FIG. 1 comprises a plurality of receiving antennas $AR_1 \ldots AR_m$ each serving a group of incoming message channels whose signals are detected in respective demodulators $RD_{1a}$-$RD_{1n} \ldots$ $RD_{ma}$-$RD_{mn}$. The detected signals from each channel, forming intermittent bursts separated by guard intervals as discussed above, pass into associated signal regenerators $RG_{1a}$-$RG_{1n}$ ... $RG_{ma}$-$RG_{mn}$ which, as particularly illustrated for regenerator $RG_{1a}$, have output leads 1 and 2 extending to respective synchronizers $SY_{1a}$-$SY_{1n}$ ... $SY_{ma}$-$SY_{mn}$. Each synchronizer, receiving the detected data bits on lead 1 and a timing signal of frequency $f_g$ on lead 2, has an output lead 3 feeding the incoming data bits, in the rhythm of a local clock frequency $f_s$ generated by a time base $CK_s$, to a data processor TD for regrouping into outgoing frames, to be modulated upon respective carriers by amplifying modulators $MA_{1a}$-$MA_{1n}$ ... $MA_{ma}$-$MA_{mn}$ for retransmission via antennas $AT_1$ ... $AT_m$.

Time base $CK_s$ generates a square wave of frequency $2f_s$ on a lead 6 extending to all the synchronizers $SY_{1a}$ ... $SY_{mn}$. Under the assumed conditions, each half-cycle of this square wave has a length $1/4f_s$ approximately corresponding to a quarter of a bit period $1/f_g$, thanks to the use of high-stability clock circuits in time base $CK_s$ and at the associated ground stations. Since these clock circuits are independent of one another, there is no correlation between the phases of the incoming bit streams and the on-board clock frequency $f_s$.

Figure 2:
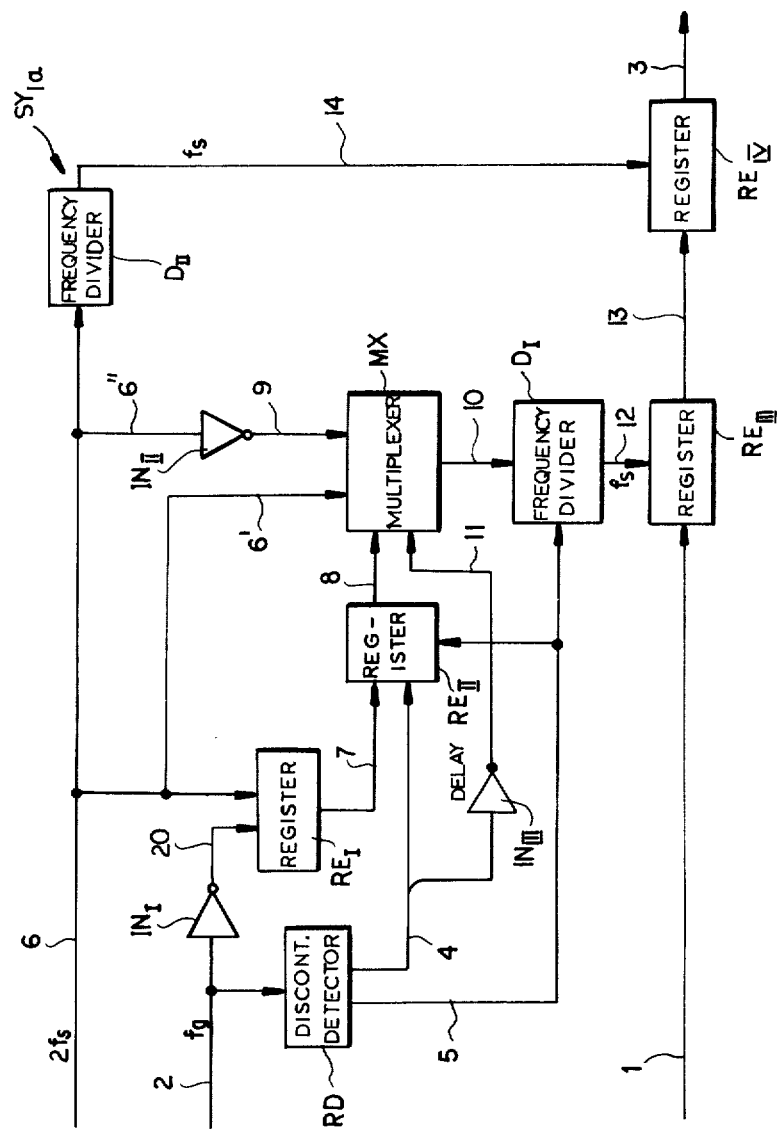
FIG. 2 is a more detailed circuit diagram of a synchronizer according to our invention shown in block form in FIG. 1.
Figure 3:
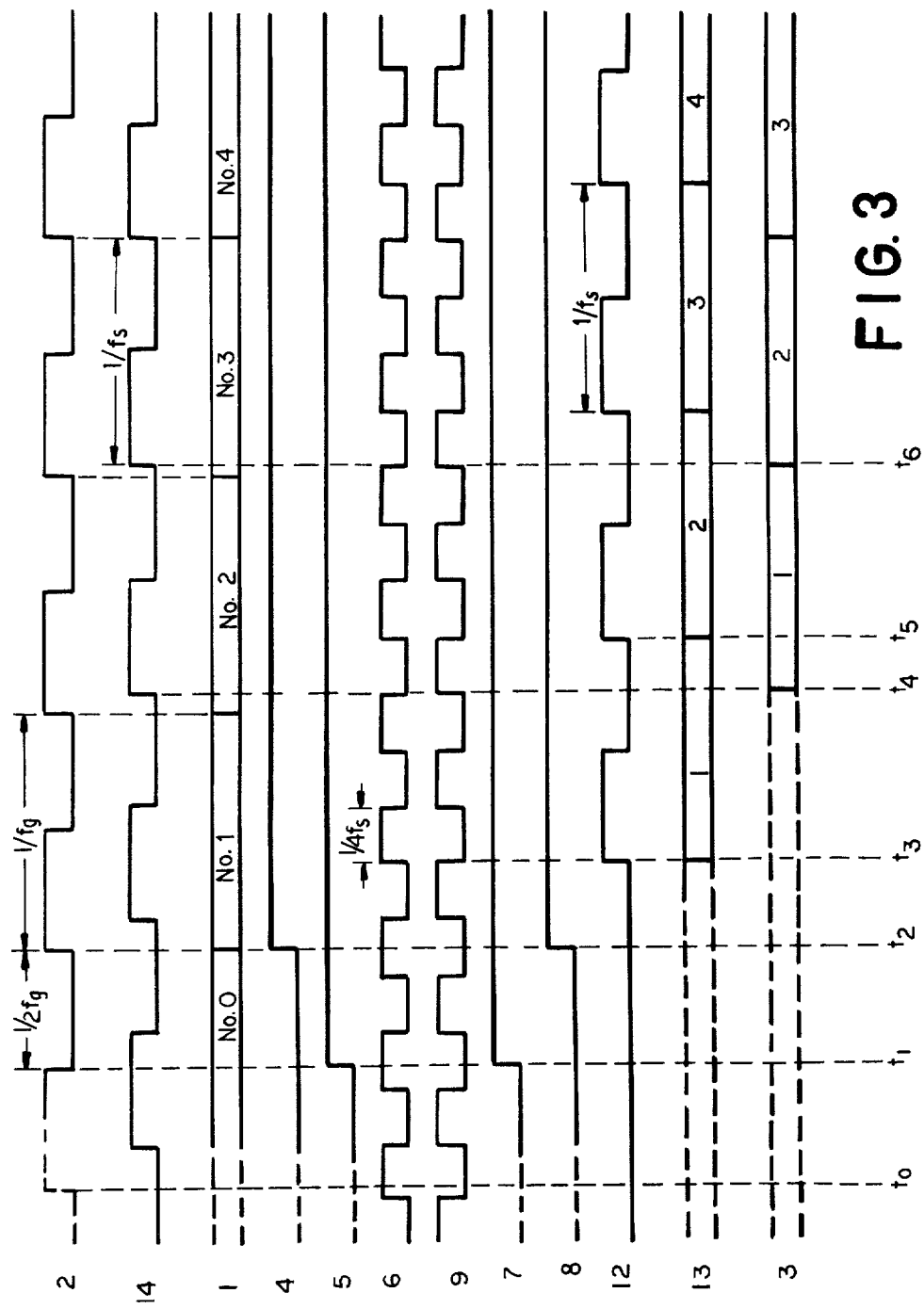
FIG. 3 is a set of graphs relating to the operation of the synchronizer of FIG. 2.

Reference will now be made to FIG. 2 for a detailed description of synchronizer $SY_{1a}$ which, of course, is representative of all corresponding units in FIG. 1. The synchronizer comprises a conventional discontinuity detector RD connected to lead 2 for receiving the timing signal transmitted over that lead by the associated regenerator $RG_{1a}$ (FIG. 1) in the presence of an incoming signal stream. Two output leads 4 and 5 of detector RD are de-energized in the absence of this timing signal, i.e. during the guard interval separating successive bursts. Lead 5 is energized at the beginning of the first complete half-cycle of frequency $f_g$ upon the reappearance of the timing signal, i.e. at the midpoint of an initial bit period No. 0 of the data stream on lead 1 as seen in FIG. 3 whose graphs represent the signals on the correspondingly numbered leads of FIG. 2; lead 4 is energized one half-cycle $1/2f_g$ thereafter, i.e. at the end of the initial bit period No. 0. Although only one bit period No. 0 (shown incomplete) has been illustrated, it should be understood that several such periods devoid of any message content may be provided in order to enable the regenerator $RG_{1a}$ of FIG. 1 to recognize the bit cadence for the purpose of deriving therefrom the timing signal on lead 2. This timing signal is also applied, via an inverter $IN_1$, to an input lead 20 of a register $RE_I$ receiving the square wave $2f_s$ from the output lead 6 of time base $CK_s$ (FIG. 1).

Register $RE_I$ has an output lead 7 extending to a loading input of another register $RE_{II}$ which has a control input connected to lead 4 and a clearing input connected to lead 5; this register is cleared during the guard interval, i.e. with lead 5 de-energized, and is thus receptive to the amplitude of the square wave of double clock frequency present on lead 6 as sampled at the instant when the timing signal on lead 2 raises the signal level on lead 4 from a logical "0" to a logical "1". The amplitude sample appearing at that instant on lead 7 is stored for the duration of the burst and appears on a lead 8 extending to a switching input of a multiplexer MX. The multiplexer has two data inputs, i.e. an input 6' connected to lead 6 and an input 9 connected to a branch 6" of the same lead via an inverter $IN_{II}$; these two inputs, accordingly, carry two identical square waves of frequency $2f_s$ which are 180° out of phase. Multiplexer MX has an enabling input 11 which during the guard interval receives a blocking signal from lead 4 by way of a further inverter $IN_{III}$ also acting as a delay device; thus, the multiplexer is unblocked shortly after the energization of lead 4 to switch its output 10 to one or the other of its inputs 6', 9, depending on the wave amplitude stored at that time in register $RE_{II}$. The delay introduced by inverter $IN_{III}$ amounts to a small fraction of a clock cycle and is designed to stabilize the voltage level on lead 8 before the multiplexer is turned on.

The output lead 10 of multiplexer MX extends to a frequency divider $D_I$ of step-down ratio 2:1 (e.g. a flip-flop of J-K type) which is also disabled during the guard interval by the absence of voltage on lead 5. When the voltage on that lead has changed from logical "0" to logical "1", divider $D_I$ transmits a square wave of clock frequency $f_s$ on a lead 12 to a control input of a register $RE_{III}$ receiving the incoming data bits from lead 1. Depending on the position of multiplexer MX, the square wave on lead 12 has leading edges coinciding with alternate leading edges of either the original square wave $2f_s$ on input 6' or the inverted square wave on input 9. These leading edges command the loading of register $RE_{III}$ with the logical value appearing on an output lead 13 of the register extending to a loading input of a further register $RE_{IV}$ in cascade therewith. A control input 14 of register $RE_{IV}$ is connected to lead 6 through another frequency divider $D_{II}$ similar to divider $D_I$, input 14 thus carrying a further square wave of clock frequency $f_s$ in fixed phase relationship with the two control waves on multiplexer inputs 6' and 9. The leading edges of the wave present on register input 14 command the readout of the stored bits to the output lead 3 of the synchronizer extending to the data processor TD of FIG. 1.

In the specific instance assumed for the signals shown in FIG. 3, a guard interval terminates at an instant $t_0$ which marks the start of the initial bit period (or sequence of initial bit periods) No. 0 as shown in graph 1. The timing signal on lead 2, in the form of a square wave of frequency $f_g$, comes into existence during the first half of this bit period (or of the last bit period of the sequence) and goes to zero at an instant $t_1$, its trailing edge triggering the detector RD to energize the output lead 5 thereof. At the same time, the square wave $2f_s$ present on lead 6 is sampled in register $RE_I$ and, as shown in graph 6, is found to have an amplitude of logical level "1" which thereupon remains inscribed on the input lead 7 of register $RE_{II}$. An instant $t_2$, occurring after another half-cycle $\frac{1}{2}f_g$ of the ground-station clock, the leading edge of the timing signal shown in graph 2 gives rise to the enabling signal on lead 4, causing transmission of the wave sample from lead 7 to the switching input 8 of multiplexer MX. The high signal level on lead 8 switches the multiplexer onto its input 9 which carries the inverted square wave shown in the corresponding graph of FIG. 3; that square wave has a trailing edge which occurs in the second quarter of the first informative bit period No. 1, namely at an instant $t_3$. It will be evident that the inverted square wave on input 9 would have a trailing edge in the second quarter of this bit period if the wave amplitude on lead 6 had been low instead of high at the sampling instant $t_1$.

Frequency divider $D_I$ also acts as a phase inverter so that the first leading edge of the wave of clock frequency $f_s$ applied to the control input of register $RE_{III}$ coincides with the trailing edge of the inverted wave present on leads 9 and 10 at time t₃. At this time, therefore, the incoming data bit appearing on lead 1 in period No. 1 is loaded into register RE$_{III}$ and read out on its output lead 13. Exactly three quarters of a clock cycle later, at instant t₄, the bit is written into register RE$_{IV}$ in response to the leading edge of the square wave of clock frequency f$_s$ which is continuously present on the control input 14 of that register; the same bit, therefore, appears on the synchronizer output 3 with a delay of roughly one bit period 1/f$_g$. That delay would have been foreshortened by a quarter of a clock cycle if the first trailing edge of the timing signal in graph 2 of FIG. 3 had coincided with a low amplitude of the square wave shown in graph 6, with resulting loading of the bit into register RE$_{III}$ upon the occurrence of a trailing edge of the wave of graph 6 coinciding with a trailing edge of the wave of graph 14.

In an analogous manner, the data bit arriving in period No. 2 is entered first in register RE$_{III}$ and then in register RE$_{IV}$ at successive instants t₅ and t₆ coinciding with the next-following leading edges of the waves shown in graphs 12 and 14.

The relative phasing of the waves of frequencies f$_g$ and f$_s$ in graphs 2 and 14 has been exaggerated to show more clearly the drift occurring from one clock cycle to the next. Since the first leading edge of the wave of graph 12 (instant t₃) invariably falls into the second quarter of the first informative bit period No. 1, exactly one reading command loading the register RE$_{III}$ will be generated during the following bit period as long as the cumulative phase difference does not amount to a drift of more than 1/f$_s$ at the end of the burst.

The incoming data bits, accordingly, are received by data processor TD in step with the local clock frequency f$_s$, subject only to minor internal delays which can be readily compensated.

Naturally, the inverted square wave fed to the input 9 of multiplexer MX could be generated directly within the time base CK$_s$ rather than in the synchronizer, as shown in FIG. 2, under the control of that time base; the same is true of the square wave of twice the clock frequency f$_s$ supplied to the control input 14 of register RE$_{IV}$. It will also be understood that the control signals fed to multiplexer inputs 6' and 9 need not be the illustrated square waves but could be trains of shorter pulses respectively coinciding with the trailing and leading edges of the square wave shown in graph 6 of FIG. 3. These and other modifications, readily apparent to persons skilled in the art, are deemed to come within the scope of our invention as defined in the appended claims.

We claim:

1. A method of timing the reading of data bits in a stream of digital signals intermittently received by a relay station from a remote transmitting station, said digital signals arriving with a bit cadence f$_g$ close to a clock frequency f$_s$ available at said relay station, comprising the steps of:
   (a) generating a square wave of frequency 2f$_s$;
   (b) extracting a timing signal corresponding to said bit cadence f$_g$ from a signal stream of limited duration detected at said relay station;
   (c) sampling said square wave, in response to said timing signal, at an instant substantially coinciding with the midpoint of an initial bit period of the detected signal stream, said bit period having a length 1/f$_g$ approximately equaling a clock cycle 1/f$_s$;
   (d) selecting, on the basis of the sample obtained in step (c), one of two mutually interleaved trains of synchronizing pulses each having a cadence corresponding to said clock frequency f$_s$, the first synchronizing pulse so selected occurring in one of the two middle quarters of a bit period;
   (e) reading the bits of the detected signal stream at the instants of occurrence of the synchronizing pulses of the selected train; and
   (f) organizing the bits to read into a data frame in step with said clock frequency f$_s$.

2. A method as defined in claim 1 wherein said interleaved trains of synchronizing pulses are homologous pulse flanks of said square wave and of another square wave of the same frequency 2f$_s$ in phase opposition therewith.

3. A method as defined in claim 1 or 2 wherein the bits read in step (e) are stored to the end of a clock cycle before transfer to a processor as part of the data frame of step (f).

4. A system for timing the reading of data bits in a stream of digital signals intermittently received by a relay station from a remote transmitting station, comprising:
   a time base establishing a clock frequency f$_s$ close to the bit cadence f$_g$ in an incoming stream of digital signals, said time base generating a square wave of frequency 2f$_s$;
   receiving means for detecting an incoming signal stream of limited duration and extracting therefrom a timing signal corresponding to said bit cadence f$_g$;
   sampling means controlled by said timing signal for ascertaining the amplitude of said square wave at an instant substantially coinciding with the midpoint of an initial bit period of the detected signal stream, said bit period having a length 1/f$_g$ approximately equaling a clock cycle 1/f$_s$;
   switch means controlled by said sampling means for selecting one of two mutually interleaved trains of synchronizing pulses generated by said time base, each having a cadence corresponding to said clock frequency f$_s$, in response to said amplitude so that the first synchronizing pulse so selected occurs in one of the two middle quarters of a bit period;
   register means connected to said receiving means for temporarily storing successive bits of the detected signal stream, said register means being controlled by said switch means for reading out the stored bits at the instants of occurrence of the synchronizing pulses of the selected train; and
   data-processing means controlled by said time base and connected to said register means for receiving the read-out bits during successive clock cycles.

5. A system as defined in claim 4 wherein said switch means comprises a multiplexer with two inputs connected to an output lead of said time base carrying said square wave, one of said inputs being in series with an inverter, said trains of synchronizing pulses being constituted by homologous pulse flanks of said square wave and of its inversion respectively appearing on said inputs.

6. A system as defined in claim 5 wherein said sampling means comprises a signal store adapted to retain said amplitude for the duration of said signal stream, said multiplexer having a switching input connected to said signal store and an enabling input connected to said receiving means for activation by said timing signal with a predetermined delay following operation of said sampling means.

7. A system as defined in claim 5 or 6, further comprising a 2:1 frequency divider connected to said multiplexer for deriving from the selected square wave a first control wave of said clock frequency $f_s$, said register means comprising a first register with a loading input connected to said frequency divider for accepting an incoming bit at the beginning of each cycle of said first control wave, said register means further comprising a second register in cascade with said first register and provided with a loading input connected to said time base for receiving therefrom a second control wave of said clock frequency $f_s$ for transferring each incoming bit from said first register to said data-processing means with a delay equaling a fraction of a clock cycle.

8. A system as defined in claim 7, further comprising another 2:1 frequency divider connected to said output lead for deriving said second control wave from said square wave.

* * * * *